United States Patent [19]

Imada

[11] 4,108,278

[45] Aug. 22, 1978

[54] CONSTANT-QUANTITY OIL DISTRIBUTING VALVE FOR USE IN CENTRAL LUBRICATION SYSTEM

[76] Inventor: Yoshio Imada, c/o Kabushiki Kaisha Japan Herg, No. 203, Rose-Plaza Kagetsuan, No. 4-20 Namamugi 5-chome, Tsurumi-ku, Yokohama, Japan

[21] Appl. No.: 741,865

[22] Filed: Nov. 15, 1976

[51] Int. Cl.² .............................. F16N 25/00
[52] U.S. Cl. .................. 184/7 D; 184/7 E; 222/335
[58] Field of Search ........... 184/7 D, 7 E, 7 F, 61, 184/7 R; 137/102; 222/335

[56] References Cited

U.S. PATENT DOCUMENTS

| | | | |
|---|---|---|---|
| 2,478,260 | 8/1949 | Fioretti | 184/7 E |
| 3,093,153 | 6/1963 | Horowitz | 137/102 |
| 3,121,475 | 2/1964 | McKenzie | 184/7 E |
| 3,353,712 | 11/1967 | Prescott | 184/7 D X |
| 3,581,845 | 6/1971 | Nedergnen | 184/7 D |
| 3,664,462 | 5/1972 | Smith | 184/7 D |
| 3,715,013 | 2/1973 | Lyth et al. | 184/7 E X |
| 3,809,184 | 5/1974 | Smith | 222/335 X |
| 3,851,658 | 12/1974 | Bunyard | 137/102 |
| 3,972,341 | 8/1976 | Wheless | 137/102 |

Primary Examiner—David H. Brown
Attorney, Agent, or Firm—Graybeal, Barnard & Uhlir

[57] ABSTRACT

A two-dimensional constant-quantity oil distributing valve for use in a central lubrication system, which includes an outlet port, an inlet passage, an oil accumulating chamber and a pressure accumulating chamber, with the axes of the outlet port, inlet passage, oil accumulating chamber and pressure accumulating chamber being included in a plane, i.e., arranged two dimensionally. This valve includes from one side to the other the outlet port, valve means, inlet passage, oil accumulating chamber and pressure accumulating chamber, while the axes of these members except for that of the inlet passage are in alignment on one line with each other, with the axis of the inlet passage being directed at a right angle to the aforesaid aligned common axis. Unlike the prior art three dimensional distributing valve of this kind, the valve according to the present invention minimizes its size, because of the two-dimensional arrangement of the components involved.

1 Claim, 4 Drawing Figures

CONSTANT-QUANTITY OIL DISTRIBUTING VALVE FOR USE IN CENTRAL LUBRICATION SYSTEM

BACKGROUND OF THE INVENTION

1. Field of the invention

This invention relates to a constant-quantity oil distributing valve for use in a central lubrication system, and more particularly to a constant-quantity oil distributing valve of a two dimensional arrangement.

2. Description of the prior art

As shown in FIG. 1, a three dimensional type constant-quantity oil distributing valve is known, in which, for instance, an axis A of an inlet passage extends along the X-axis, an axis B of an outlet port extends along the Y axis, and the axis C of a pressure accumulating chamber runs along the Z axis.

With the valve of this arrangement, one of the aforesaid three members i.e., the inlet passage, outlet port and pressure accumulating chamber necessarily protrudes from a surface, on which the valve is mounted, i.e., the surface of a machine body. This results in various disadvantages in operations associated with a machine, or a danger of a damage being caused in the valve itself due to inadvertent impingement of another body thereon.

SUMMARY OF THE INVENTION

It is a principal object of the present invention to provide a constant-quantity oil distributing valve for use in a central lubrication system, in which the axes of an inlet passage, outlet port and a pressure accumulating chamber are included in a plane or arranged two-dimensionally, thereby minimizing the size or dimensions of the valve.

According to the present invention there is provided a constant-quantity oil distributing valve for use in a central lubrication system, comprising from one side to the other: an outlet portion provided in an end plug having a build-up portion on the inner end surface thereof, said build-up portion including a passage leading to said outlet port; valve means including a resilient valve body and a valve seat, said resilient valve body being disposed between said build-up portion and said valve seat, and said valve means further including a passage therein; an inlet passage communicated with said passage in said valve means; an oil accumulating chamber which may be communicated with said inlet passage or said outlet port, depending on the elastically deformed positions of said resilient valve body; a piston facing said oil accumulating chamber; and a pressure accumulating chamber, in which a compressible material is filled, and which contains said piston therein; whereby the axes of said outlet port, said valve means, said oil accumulating chamber, said piston and said pressure accumulating chamber being in alignment on a line with each other, with the axis of said inlet passage being directed at a right angle to said axes or a common axis of the other components.

DESCRIPTION OF THE PREFERRED EMBODIMENTS

Figure 1:
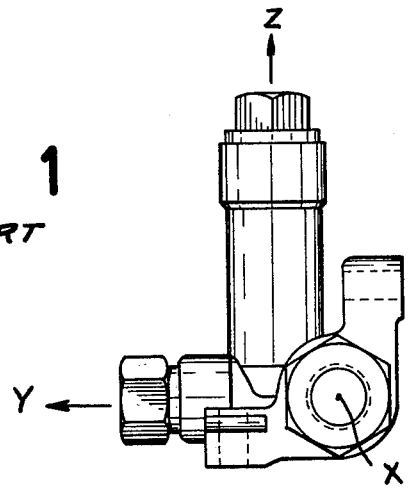
FIG. 1 is a side view of a prior art constant-quantity oil distributing valve for use in a central lubrication system.
Figure 2:
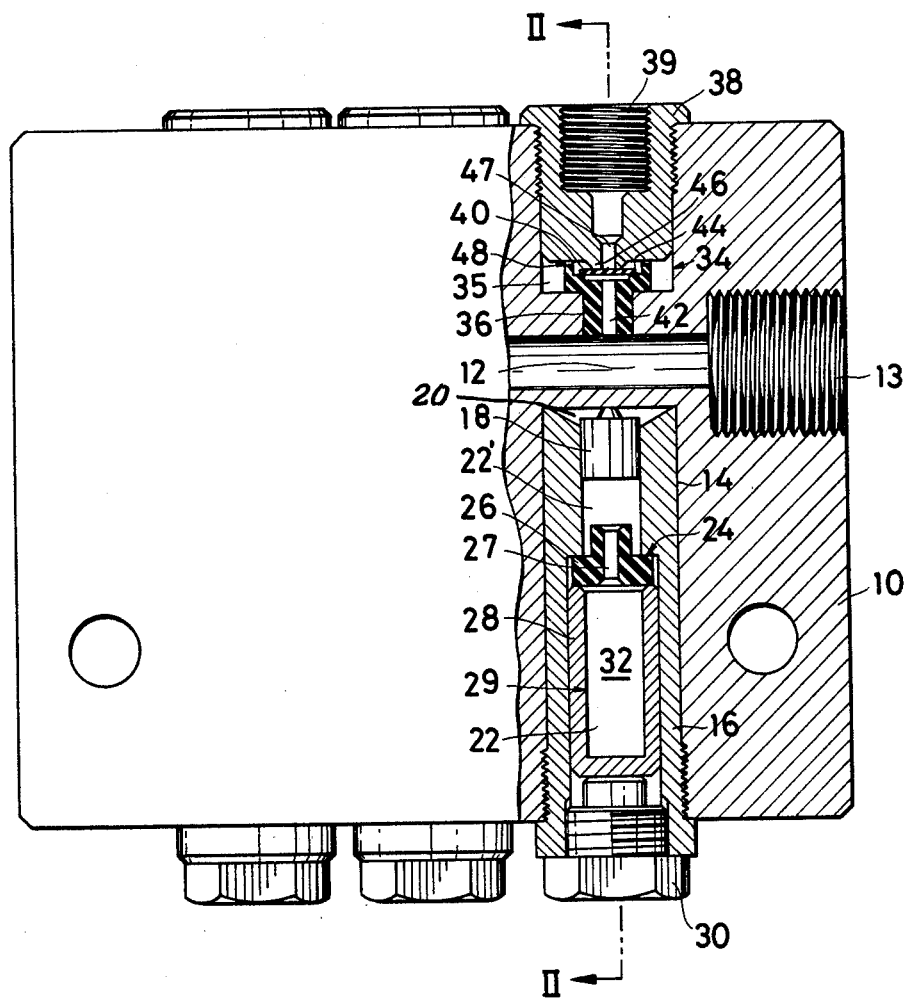
FIG. 2 is a longitudinal cross-sectional view of the constant quantity oil distributing valve of the type described, according to the present invention.
Figure 3:
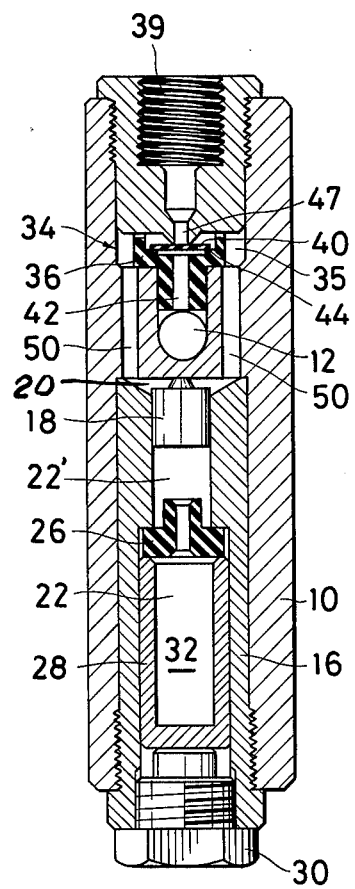
FIG. 3 is a cross-sectional view taken along the line II—II of FIG. 2.

Referring first to FIG. 3, shown at 10 is a body proper of a constant quantity oil lubricating valve according to the present invention. As shown from top to the bottom of the constant quantity oil distributing valve in FIG. 3, there are positioned within the body proper 10, an outlet port 39 provided in an end plug 38, a passage 47 communicated with the port 39 and extending through the end plug 38, a resilient valve body 40, a valve member 36 including a valve seat 44, a valve passage 42, an inlet passage 12, an annular space or passage 50 shown on the opposite sides of the inlet passage 12, an oil accumulating chamber 20, a piston 18, a front chamber 22', a stopper having a passage therein, and a pressure accumulating chamber 22, in which a compressible material 32 is filled. The compressible material 32 may be a gas such as air. The pressure accumulating chamber 22 is communicated through the passage in the stopper 26 with the front chamber 22', so that the compressible material is also filled in the front chamber 22'. The pressure accumulating chamber 22 is defined by a bottomed cylinder 28 therein which is retained in position by means of an end screw 30. Shown at 16 is a cylinder defining the front chamber 22' and retaining the bottomed cylinder 28 therein. The cylinder 16 is fitted in the body proper 10 of the distributing valve. The inlet passage 12 has a threaded wall shown at 13, with which is in engagement a pipe or the like leading to a pressure source. The inner surface of the end plug 38 has a built-up portion 46, on which the resilient valve body 40 abuts, and thus the valve body 40 is positioned between the build-up portion 46 and the valve seat 44. The resilient valve body 40 may be elastically deformed along the surface of the build-up portion 46, when a pressure is applied thereto through the inlet passage 12, thus allowing the flow of oil from the inlet passage 12 through the passage 42 past the valve body 40 into the annular passage 50 to the oil accumulating chamber 20, while closing the passage 47 communicating with the outlet port 39. As a result, the piston 18 is displaced into the front chamber 22', and thus the compressible material 32 may be forced through the passage defined in the stopper 26 into the pressure accumulating chamber 22. Alternatively, the pressure accumulating chamber may be replaced by a suitable spring means.

Figure 4:
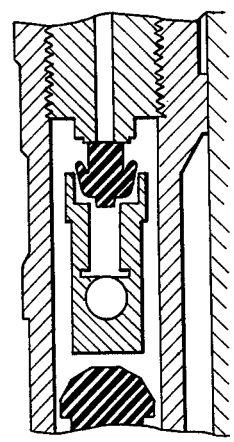
FIG. 4 is a cross-sectional view a modification of a valve body.

When the pressure from the inlet passage 12 is lowered or relieved, then the valve body 40 is urged against the valve seat 44 to be elastically deformed so as to leave a space under the opening of the passage 47, i.e., to allow the flow of oil into the passage 47 and then into the outlet port 39. At this time, the piston 18 is displaced or returned to the initial position due to the expanding action of the compressed material 32, thereby forcing oil from the oil accumulating chamber 20 into the annular space 50, then into the passage 47 leading to the outlet port 39. As shown, the inlet passage 12 runs at a right angle to the common axis of the members, such as end plug 38, valve means or member 36, cylinder 16, piston 18, pressure accumulating chamber 22. The resilient valve body 40 may be of any shape, as far as it functions as a valve, such as shown in FIG. 4.

As is apparent from the foregoing description of the constant-quantity oil lubricating valve according to the present invention, the axes of components constituting the valve are included in a plane, i.e., arranged two-dimensionally, thus minimizing the size of the valve, when attached to a body of a machine.

Although the present invention has been described with respect to specific details of certain embodiments thereof, it is not intended that such details be limitations upon the scope of the invention except insorfar as set forth in the claim.

What is claimed is:

1. A constant-quantity oil distributing valve for use in a central lubrication system, comprising from one side to the other:
   - an outlet portion provided in an end plug having a build-up portion on the inner end surface thereof, said build-up portion including a passage leading to said outlet port;
   - valve means including a resilient valve body and a valve seat, said resilient valve body being disposed between said build-up portion and said valve seat, and said valve means further including a passage therein;
   - an inlet passage communicated with said passage in said valve means;
   - an oil accumulating chamber which may be communicated with said inlet passage or said port, depending on the elastically deformed positions of said resilient valve body;
   - a piston facing said oil accumulating means; and
   - a pressure accumulating chamber, in which a compressible material is filled, and which contains said piston therein;
   - whereby the axes of said outlet port, said valve means, said oil accumulating means, said piston and said pressure accumulating chamber being in alignment on a line with each other, with the axis of said inlet passage being directed at a right angle to said axes or a common axis of the other components.

* * * * *